United States Patent
Ranki et al.

(10) Patent No.: US 9,157,981 B2
(45) Date of Patent: Oct. 13, 2015

(54) ORIENTATION

(75) Inventors: Ville Valtteri Ranki, Espoo (FI); Antti Paavo Tapani Kainulainen, Espoo (FI); Fabio Belloni, Espoo (FI)

(73) Assignee: Nokia Technologies Oy, Espoo (FI)

( * ) Notice: Subject to any disclaimer, the term of this patent is extended or adjusted under 35 U.S.C. 154(b) by 768 days.

(21) Appl. No.: 13/322,918

(22) PCT Filed: May 27, 2009

(86) PCT No.: PCT/EP2009/056451
§ 371 (c)(1),
(2), (4) Date: Apr. 13, 2012

(87) PCT Pub. No.: WO2010/136064
PCT Pub. Date: Dec. 2, 2010

(65) Prior Publication Data
US 2012/0188128 A1    Jul. 26, 2012

(51) Int. Cl.
*G01S 1/04*    (2006.01)
*G01S 3/04*    (2006.01)
*G09B 29/10*   (2006.01)

(52) U.S. Cl.
CPC ............... *G01S 1/047* (2013.01); *G01S 3/046* (2013.01); *G09B 29/102* (2013.01)

(58) Field of Classification Search
CPC ............ G01S 1/024; G01S 1/68; G01S 3/12; G01S 3/14
USPC .......... 342/386, 417, 422, 443; 701/409, 454, 701/532
See application file for complete search history.

(56) References Cited

U.S. PATENT DOCUMENTS

| | | |
|---|---|---|
| 5,910,057 A | 6/1999 | Quimby et al. |
| 6,113,504 A | 9/2000 | Kuesters |
| 6,169,516 B1 | 1/2001 | Watanabe et al. |
| 6,317,689 B1 | 11/2001 | Lee |
| 6,908,404 B1 | 6/2005 | Gard |
| 2007/0197229 A1 | 8/2007 | Kalliola et al. |
| 2009/0009398 A1 | 1/2009 | Taylor et al. |

FOREIGN PATENT DOCUMENTS

| | | |
|---|---|---|
| CN | 1174610 A | 2/1998 |
| CN | 1474934 A | 11/2001 |
| CN | 1576877 A | 2/2005 |
| CN | 101385382 A | 3/2009 |
| DE | 10064978 C1 | 7/2002 |

(Continued)

OTHER PUBLICATIONS

European Office Action received for Patent Application No. 09779559.5, dated Apr. 15, 2013, 5 pages.

(Continued)

*Primary Examiner* — Dao Phan
(74) *Attorney, Agent, or Firm* — Locke Lord LLP (57) ABSTRACT

An apparatus, a method and a computer program are provided. The apparatus comprises: determination circuitry configured to determine a first bearing from a first location to a radio transmitter at a second location, using at least one radio signal received from the radio transmitter; and orientation circuitry configured to control orientation of an electronic map, to align the first bearing with a second bearing of the electronic map, from the first location to the radio transmitter.

17 Claims, 7 Drawing Sheets

(56) References Cited

FOREIGN PATENT DOCUMENTS

| GB | 2298539 A | 9/1996 |
| GB | 2312580 A | 10/1997 |
| WO | 96/14588 A1 | 5/1996 |
| WO | 2009056150 A1 | 5/2009 |

OTHER PUBLICATIONS

Chinese Office Action received for Patent Application No. 200980159522.3, dated Apr. 3, 2013, 14 pages.
Chinese Office Action received for Patent Application No. 200980159522.3, dated Aug. 5, 2013, 6 pages.
European Office Action received for Patent Application No. 09779559.5, dated Dec. 12, 2012, 6 pages.
International Search Report and Written Opinion received for corresponding Patent Cooperation Treaty Application No. PCT/EP2009/056451, dated Mar. 26, 2010, 9 pages.
International Preliminary Report received for corresponding Patent Cooperation Treaty Application No. PCT/EP2009/056451, dated Nov. 29, 2011, 7 pages.
Office action received for corresponding Chinese Patent Application No. 200980159522.3, dated Feb. 21, 2014, 9 pages, No English Language Translation available.
Office action received for corresponding Chinese Patent Application No. 200980159522.3, dated Sep. 11, 2014, 5 pages, No English Language Translation available.

ORIENTATION

RELATED APPLICATION

This application was originally filed as Patent Cooperation Treaty Application No. PCT/EP2009/056451 filed May 27, 2009.

FIELD OF THE INVENTION

Embodiments of the present invention relate to orientation. In particular, they relate to an apparatus, a method and a computer program for orientating an electronic map.

BACKGROUND TO THE INVENTION

When an electronic map is displayed on a display of an electronic apparatus, it may not be orientated correctly relative to a user's surroundings. This can make it difficult for the user to orientate himself with his surroundings.

BRIEF DESCRIPTION OF VARIOUS EMBODIMENTS OF THE INVENTION

According to various, but not necessarily all, embodiments of the invention there is provided an apparatus, comprising: determination circuitry configured to determine a first bearing from a first location to a radio transmitter at a second location, using at least one radio signal received from the radio transmitter; and orientation circuitry configured to control orientation of an electronic map, to align the first bearing with a second bearing of the electronic map, from the first location to the radio transmitter.

The determination circuitry may be configured to determine that the apparatus is at the first location on the electronic map. The determination circuitry may be configured, after analyzing the relative positioning of the apparatus and the radio transmitter on the electronic map, to control orientation of the electronic map, to align the first bearing with the second bearing.

The determination circuitry may be configured to determine the second bearing from the at least one radio signal received from the radio transmitter.

The orientation circuitry may be configured to orientate the electronic map in the absence of movement of the apparatus.

The determination circuitry may be configured, in response to the apparatus being moved from the first location to a third location, to determine a third bearing from the third location to the radio transmitter at the second location. The orientation circuitry may be configured, in response to determination of the third bearing, to control re-orientation of the electronic map, to align the third bearing with a fourth bearing of the electronic map, from the third location to the radio transmitter.

The apparatus may further comprise receiver circuitry configured to receive the at least one radio signal from the radio transmitter.

The determination circuitry may be configured to select a radio transmitter suitable for use in orientating the electronic map. The determination circuitry may be configured to select a radio transmitter from multiple radio transmitters.

The determination circuitry may be configured to determine whether a radio transmitter is suitable for use in orientating the electronic map by analyzing at least one radio signal received from that radio transmitter.

The determination circuitry may be configured to determine whether a radio transmitter is suitable for use in orientating the electronic map by determining whether there is a line of sight between the first location and that radio transmitter.

The determination circuitry may be configured to determine whether a radio transmitter is suitable for use in orientating the electronic map by determining a distance between the first location and that radio transmitter.

The determination circuitry may be configured to determine whether a radio transmitter is suitable for use in orientating the electronic map by determining an angle of elevation between the first location and that radio transmitter.

According to various, but not necessarily all, embodiments of the invention there is provided a method, comprising: determining a first bearing from a first location to a radio transmitter at a second location, using at least one radio signal received from the radio transmitter; and controlling orientation of an electronic map, to align the first bearing with a second bearing of the electronic map, from the first location to the radio transmitter.

The method may further comprise: determining that an apparatus is at the first location on the electronic map; and controlling, after analyzing the relative positioning of the apparatus and the radio transmitter on the electronic map, orientation of the electronic map, to align the first bearing with the second bearing.

The method may further comprise: determining the second bearing from the at least one radio signal received from the radio transmitter.

The method may further comprise: determining a third bearing from a third location to the radio transmitter at the second location; and controlling re-orientation of the electronic map, to align the third bearing with a fourth bearing of the electronic map, from the third location to the radio transmitter.

The method may further comprise: selecting a radio transmitter suitable for use in orientating the electronic map.

The radio transmitter may be selected from multiple radio transmitters.

The method may further comprise: determining whether a radio transmitter is suitable for use in orientating the electronic map by analyzing at least one radio signal received from that radio transmitter.

The suitability of a radio transmitter for use in orientating the electronic map may be determined by determining whether there is a line of sight between the first location and that radio transmitter.

The suitability of a radio transmitter for use in orientating the electronic map may be determined by determining a distance between the first location and that radio transmitter.

The suitability of a radio transmitter for use in orientating the electronic map may be determined by determining an angle of elevation between the first location and that radio transmitter.

According to various, but not necessarily all, embodiments of the invention there is provided a computer program that, when executed by a processor, enables the method as described above to be performed.

According to various, but not necessarily all, embodiments of the invention there is provided a computer program comprising computer program instructions that, when executed by a processor, enable: determining a first bearing from a first location to a radio transmitter at a second location, using at least one radio signal received from the radio transmitter; and controlling orientation of an electronic map to align the first bearing and a second bearing of the electronic map, from the first location to the radio transmitter.

The computer program instructions may further enable: determining that an apparatus is at the first location on the electronic map; and controlling, after analyzing the relative positioning of the apparatus and the radio transmitter on the electronic map, orientation of the electronic map, to align the first bearing with the second bearing.

The computer program instructions may further enable: determining the second bearing from the at least one radio signal received from the radio transmitter.

The computer program instructions may further enable: determining a third bearing from a third location to the radio transmitter at the second location; and controlling re-orientation of the electronic map, to align the third bearing with a fourth bearing of the electronic map, from the third location to the radio transmitter.

The computer program instructions may further enable: selecting a radio transmitter suitable for use in orientating the electronic map. The radio transmitter may be selected from multiple radio transmitters.

The computer program instructions may further enable: determining whether a radio transmitter is suitable for use in orientating the electronic map by analyzing at least one radio signal received from that radio transmitter.

The suitability of a radio transmitter for use in orientating the electronic map may be determined by determining whether there is a line of sight between the first location and that radio transmitter.

The suitability of a radio transmitter for use in orientating the electronic map may be determined by determining a distance between the first location and that radio transmitter.

The suitability of a radio transmitter for use in orientating the electronic map may be determined by determining an angle of elevation between the first location and that radio transmitter.

According to various, but not necessarily all, embodiments of the invention there is provided a tangible computer readable medium storing the computer program as described above.

According to various, but not necessarily all, embodiments of the invention there is provided an apparatus, comprising: determining means for determining a first bearing from a first location to a radio transmitter at a second location, using at least one radio signal received from the radio transmitter; and control means for controlling the orientation of an electronic map to align the first bearing with a second bearing of the electronic map, from the first location to the radio transmitter.

The determining means may be for determining that the apparatus is at the first location on the electronic map. The control means may be for controlling orientation of the electronic map after analyzing the relative positioning of the apparatus and the radio transmitter on the electronic map, to align the first bearing and the second bearing, The determining means may be for determining the second bearing from the at least one radio signal received from the radio transmitter.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EXEMPLARY EMBODIMENTS OF THE INVENTION

The Figures illustrate an apparatus 10/20, comprising: determination circuitry 12 configured to determine a first bearing 55 from a first location 41 to a radio transmitter 50 at a second location 51, using at least one radio signal 52 received from the radio transmitter 50; and orientation circuitry 14 configured to control orientation of an electronic map 30 to align the first bearing 55 with a second bearing 65 of the electronic map, from the first location 41 to the radio transmitter 50.

Figure 1:
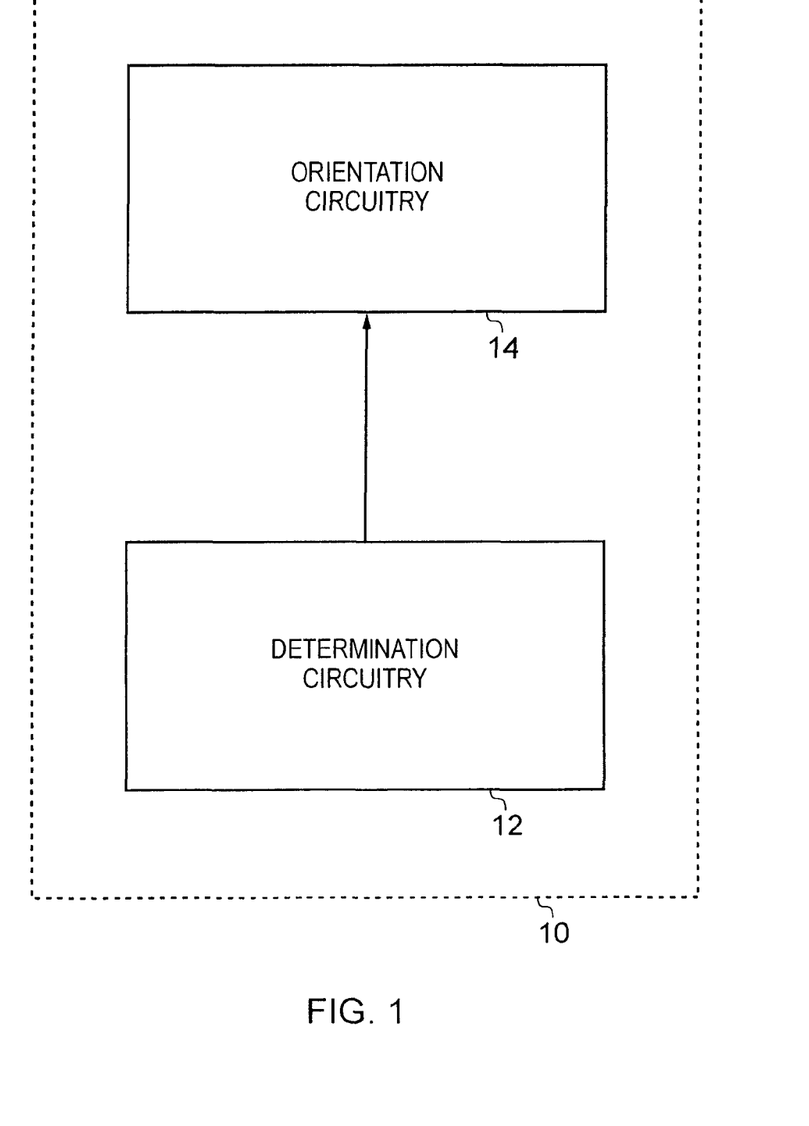
FIG. 1 schematically illustrates an example of an apparatus.

FIG. 1 illustrates an apparatus 10. The apparatus 10 comprises determination circuitry 12 and orientation circuitry 14. The determination circuitry 12 is configured to provide an output to the orientation circuitry 14.

The apparatus 10 may be electronic circuitry, such as processing circuitry. The processing circuitry may, for example, be a chip or a chipset comprising multiple chips.

Figure 2:
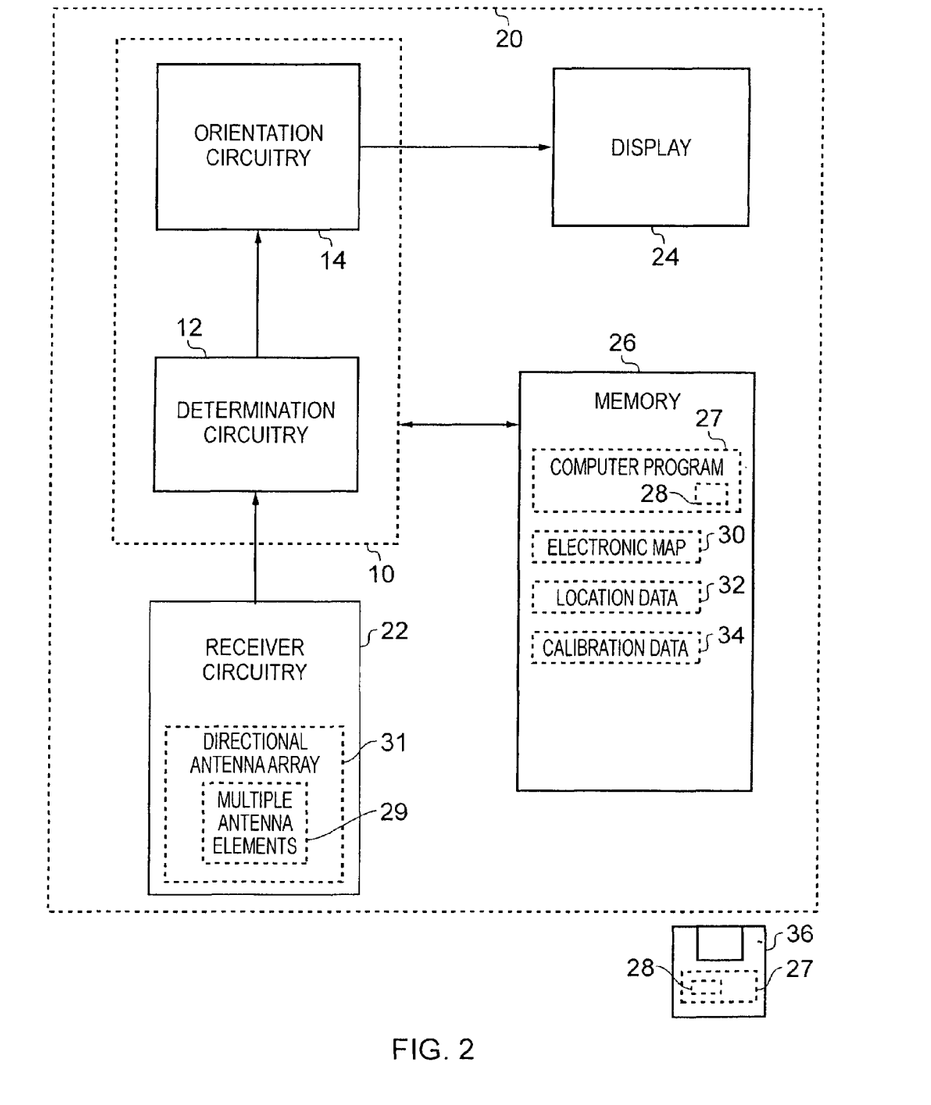
FIG. 2 schematically illustrates an example of a further apparatus.

FIG. 2 illustrates another apparatus 20. The apparatus 20 illustrated in FIG. 2 comprises the apparatus 10 illustrated in FIG. 1. In some embodiments of the invention, the apparatus 20 is a hand portable electronic apparatus such as a mobile telephone, a personal digital assistant or a portable music player.

The apparatus 20 comprises determination circuitry 12, orientation circuitry 14, receiver circuitry 22, a display 24 and a memory 26. In this example, the determination circuitry 12 and the orientation circuitry 14 are provided by a processor 10. In some embodiments of the invention, there may not be a physical distinction between the determination circuitry 12 and the orientation circuitry 14. For instance, the determination circuitry 12 and the orientation circuitry 14 may be provided by a single chip.

The elements 12, 14, 22, 24 and 26 are operationally coupled and any number or combination of intervening elements can exist (including no intervening elements).

The receiver circuitry 22 is configured to receive radio frequency signals. The radio signals may formulated according to one or more communication protocols, such as, for example: an IEEE (Institute of Electrical and Electronics Engineers) 802.11 protocol, a IEEE 802.16 protocol or a Bluetooth protocol.

The receiver circuitry 22 comprises a directional antenna array 31 including multiple antenna elements 29, each of which may be positioned and orientated differently within the apparatus 20. In some embodiments of the invention, the receiver circuitry 22 comprises different chipsets for receiving signals according to different communication protocols. In these embodiments of the invention, some or all of the antenna elements 29 may be shared between the chipsets.

Each of the antenna elements 29 may be configured to receive a radio signal individually. The receiver circuitry 22 may be configured to demodulate and down convert radio signals received by the antenna elements 29, and provide the received radio signals to the determination circuitry 12 in electrical form.

The determination circuitry 12 is configured to use the received radio signals to determine bearings from the apparatus 20 to radio transmitters, and to provide the determined bearings to the orientation circuitry 14 as an output.

The orientation circuitry 14 is configured to use bearings received from the determination circuitry 12 to control orientation of an electronic map. The orientation circuitry 14 controls the display 24 to display the orientated map.

The implementation of the processor 10 can be in hardware alone (a circuit, a processor . . . ), have certain aspects in software including firmware alone or can be a combination of hardware and software (including firmware).

The processor 10 that provides the determination circuitry 12 and the orientation circuitry 14 in this example is configured to read from and to write to the memory 26.

The memory 26 is illustrated as storing a computer program 27, an electronic map 30, location data 32 and calibration data 34.

The computer program instructions 28 control the operation of the apparatus 20 when loaded into the processor 10. The computer program instructions 28 provide the logic and routines that enables the apparatus 20 to perform the methods illustrated in FIG. 4. The processor 10 by reading the memory 26 is able to load and execute the computer program 27.

The computer program 27 may arrive at the apparatus 20 via any suitable delivery mechanism 36. The delivery mechanism 36 may be, for example, a computer-readable storage medium, a computer program product, a memory device, a record medium such as a CD-ROM or DVD, an article of manufacture that tangibly embodies the computer program 27. The delivery mechanism 36 may be a signal configured to reliably transfer the computer program 27. The apparatus 20 may propagate or transmit the computer program 27 as a computer data signal.

Although the memory 26 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'processor' or 'processing circuitry' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
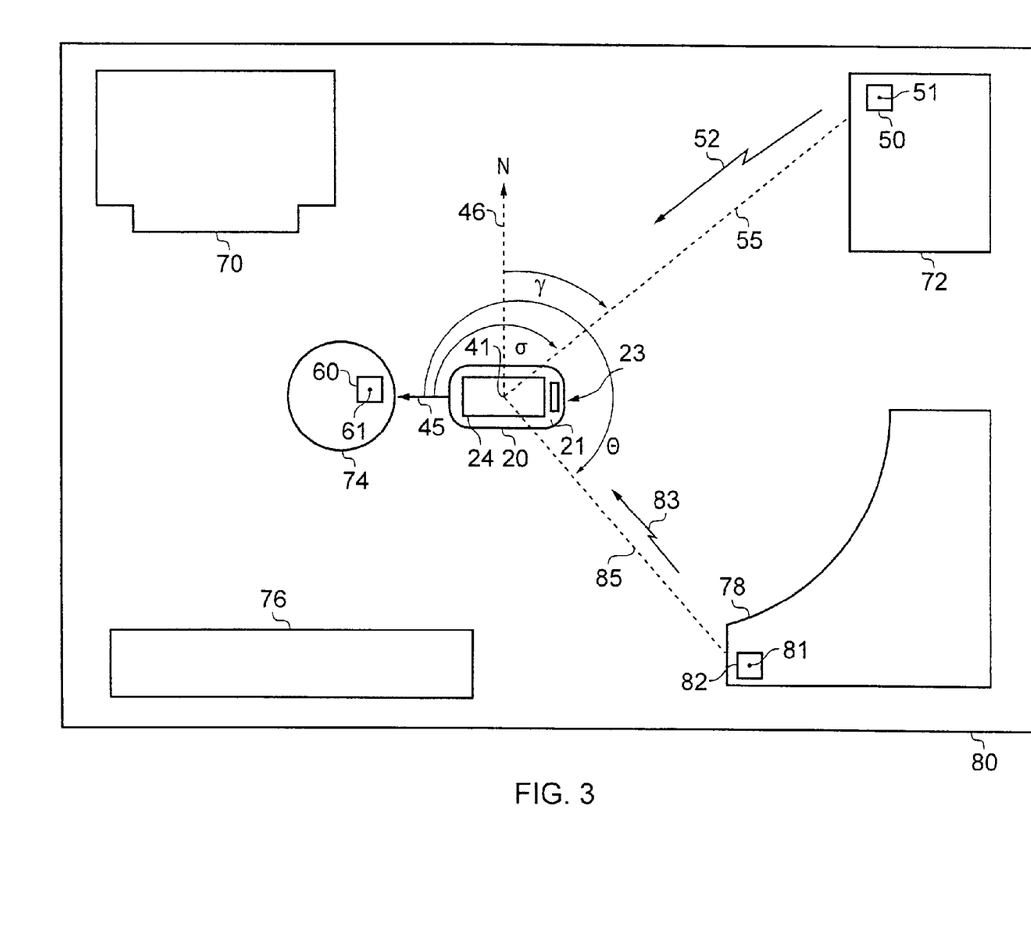
FIG. 3 illustrates a map.

FIG. 3 illustrates an overhead view of an area 80. The area 80 may be an indoor area or an outdoor area. For example, if the area 80 is an indoor area, it may be a floor of an office or a shopping center. The arrow 46 in FIG. 3 indicates a reference orientation, for example, which way is north.

The area 80 includes structures 70, 72, 74, 76, 78. The area 80 may include structures of any size or shape and those structures may be arranged in any way. The particular shapes, sizes and arrangement shown in FIG. 3 are provided merely for illustrative purposes.

FIG. 3 also illustrates a portable electronic apparatus 20 located at a position 41 in the area 80. The apparatus 20 in FIG. 3 is not shown to scale. FIG. 3 illustrates a front face 21 of the apparatus 20, which comprises a display 24 and input keys 23.

In FIG. 3, the apparatus 20 is being held in the palm of a user facing westwards. The orientation of the apparatus 20 in space defines a reference frame for the apparatus 20. In this example, the arrow 45, emanating from an upper part of the apparatus 20, indicates way the apparatus 20 is pointing, defining the reference frame of the apparatus 20. The arrow 45 indicates a "normal line" from which the apparatus 20 determines bearings.

One of the structures 72 comprises a first radio transmitter 50. Another structure 74 comprises a second radio transmitter 60. A further structure comprises a third radio transmitter 82. The radio transmitters 50, 60, 82 may periodically transmit radio signals to enable an apparatus (such as the apparatus 20 illustrated in FIG. 3) to determine its position. The signals may, for example, be periodically transmitted beacons.

In this example, the first radio transmitter 50 transmits a first radio signal 52 which is received by each of the antenna elements 29 of the receiver circuitry 22 of the apparatus 20. As each of the antenna elements 29 are positioned and orientated differently from one another, each antenna element 29 receives the first radio signal 52 in a slightly different form. For example, when the first radio signal 52 is received by one antenna element, it may have a different phase than when it is received by another antenna element. The receiver circuitry 22 demodulates and down converts the received radio signals and provides them to the determination circuitry 12 in electrical form.

Figure 4:
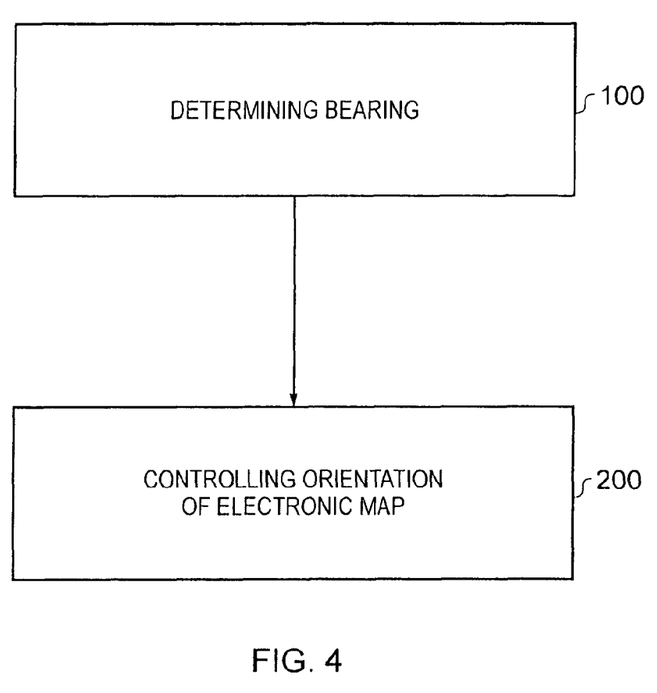
FIG. 4 illustrates a method.

At block 100 of FIG. 4, the determination circuitry 12 uses the first radio signal 52 to determine a first bearing 55 from the position 41 of the apparatus 20 to the position 51 of the first radio transmitter 50 by comparing the different forms of the first radio signal 52 that are received by the different antenna elements 29 with one another.

In some embodiments of the invention, the determination circuitry 12 may use calibration data 34 stored in the memory 26 to interpret the outputs provided by the antenna elements 29. The calibration data 34 may, for example, indicate how different outputs should be interpreted in order to determine the direction from which a radio signal was transmitted. The calibration data 34 may indicate how different outputs should be interpreted, depending upon the orientation of the apparatus 20 in space. In this regard, the apparatus 20 may, for example, comprise accelerometers for determining the orientation of the apparatus 20 in space.

In order to define a bearing from the apparatus 20 to a radio transmitter, the determination circuitry 12 may determine an angle of elevation and/or an azimuth.

An angle of elevation defines the elevation of a radio transmitter relative to the apparatus 20. The determination circuitry 12 may determine an angle of elevation by determining a direction of arrival of a radio signal at the apparatus 20, or by determining a direction of departure of the radio signal from a radio transmitter.

An azimuth defines a horizontal direction to a radio transmitter from the apparatus 20. The determination circuitry 12 may determine an azimuth by determining a direction of arrival of a radio signal at the apparatus 20, or by determining a direction of departure of the radio signal from a radio transmitter.

A two-dimensional bearing, from the apparatus 20 to a radio transmitter, may be defined by an angle of elevation or an azimuth. A three-dimensional bearing, from the apparatus 20 to a radio transmitter, may be defined by an angle of elevation and an azimuth.

In this example, first and second two-dimensional bearings 55, 85 are determined by measuring first and second azimuths α, δ in a clockwise direction from the direction 45 that the apparatus 20 is pointing in.

The first azimuth σ defining the first bearing 55, from the apparatus 20 to the first radio transmitter 50, is illustrated in FIG. 3.

The third radio transmitter 82 transmits a second radio signal 83 which is received by each of the antenna elements 29 of the apparatus 20. The determination circuitry 12 determines a second bearing 85 from the apparatus 20 to the third radio transmitter 82 using the received second radio signal 83. The second azimuth δ of the second bearing 85 is illustrated in FIG. 3.

The determination circuitry 14 may determine the position of the apparatus 20 on an electronic map 30 of the area 80 by determining the location 41 at which the first and second bearings 55, 85 intersect on the electronic map 30. The determination circuitry 12 may store the position 41 of the apparatus 20 in the memory 26 as location data 32.

In some embodiments of the invention, the apparatus 20 may receive radio signals from more than two radio transmitters to determine its position. Only two radio transmitters are mentioned in this example for illustrative purposes.

The electronic map 30, along with the user's position, could be displayed on the electronic map 30 by aligning the north direction 46 on the electronic map 30 with the direction 45 in which the apparatus 20 is pointing (corresponding to the direction in which the user is facing). This is illustrated in FIG. 5.

Figure 5:
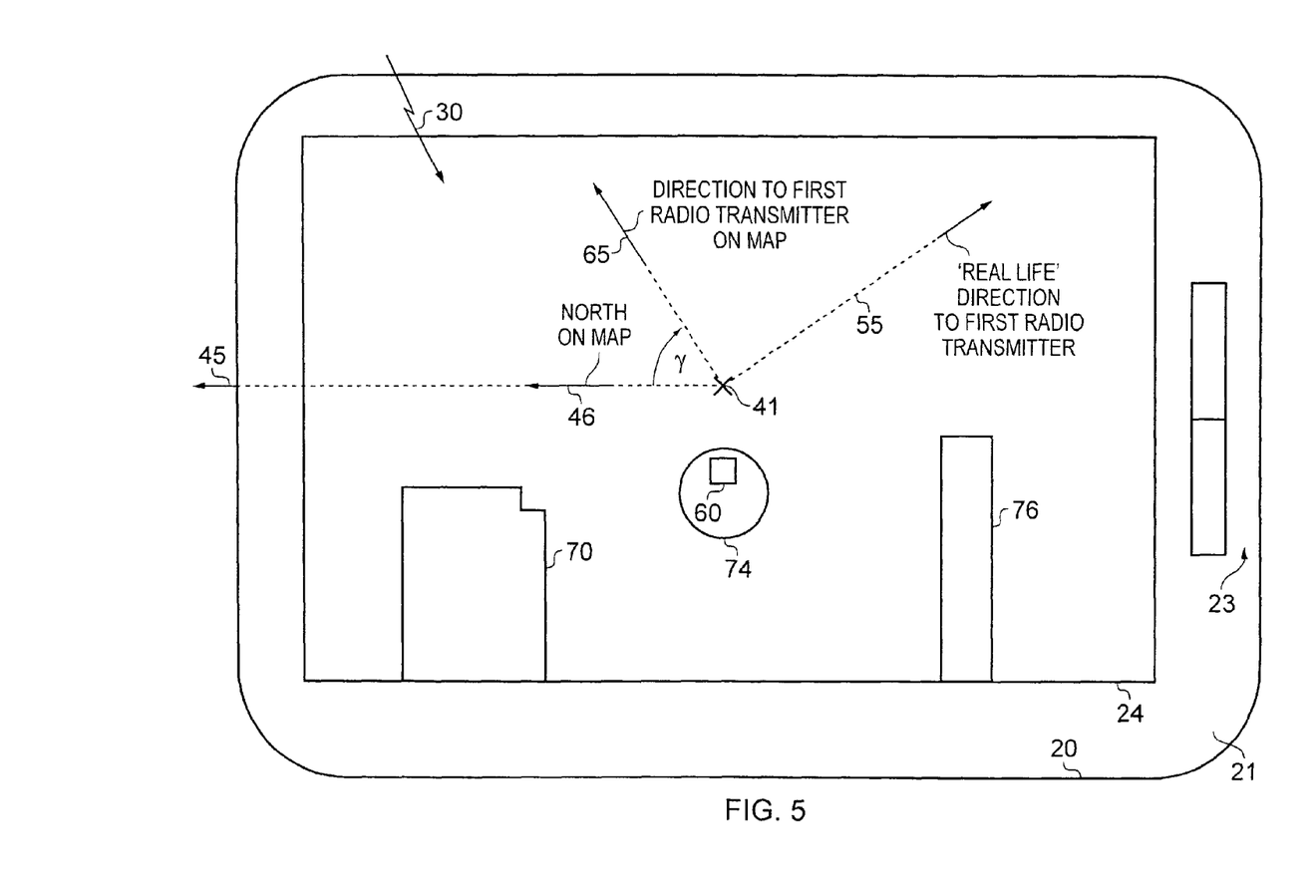
FIG. 5 illustrates an electronic map displayed on a display with a first orientation.

Due to the size of the display 24, the position 51 of the first radio transmitter 50 is not displayed on the electronic map 30 in FIG. 5. However, it can be seen from the arrow 65 in FIG. 5 that if the first radio transmitter 50 were displayed on the electronic map 30, the direction 65 from the location 41 of the apparatus 20 to the first radio transmitter 50 on the displayed electronic map 30 would be different to the 'real life' direction from the apparatus 20 to the first radio transmitter 50. This occurs because the reference frame of the apparatus 20 and the reference frame of the electronic map 30 are misaligned.

The difference between the direction 65 to the first radio transmitter 50 on the electronic map 30 and the 'real life' direction 55 to the first radio transmitter 50 could potentially make it difficult for the user of the apparatus 20 to orientate himself relative to his surroundings 70, 72, 74, 76, 78.

In embodiments of the invention, the orientation circuitry 14 of the apparatus 20 controls the orientation of the electronic map 30 by aligning the first bearing 55 with a bearing 65 of the electronic map 30. The orientation circuitry 14 therefore effectively aligns the reference frame of the apparatus 20 with the reference frame of the electronic map 30.

In this exemplary implementation, the determination circuitry 12 uses the position 41 of the apparatus to determine a third map bearing 65, from the position 41 of the apparatus 20 on the electronic map 30 to the position 51 of the first radio transmitter 50 on the electronic map 30.

In this example, the third map bearing 65 defines a direction, on the electronic map 30, from the position 41 of the apparatus 20 to the position 51 of the first radio transmitter 60 as measured clockwise from north. The azimuth γ of the third map bearing 65 is illustrated in FIGS. 3 and 5.

The determination circuitry 12 provides the first bearing 55 and the third map bearing 65 to the orientation circuitry 14. At block 200 of FIG. 4, the orientation circuitry 14 orientates the electronic map 30 by aligning the first bearing 55 with the third map bearing 65.

For instance, the orientation circuitry 14 may compare the first bearing 55 and the third bearing 65 in order to determine how to align the first bearing 55 with the third map bearing 65.

In this example, the first azimuth σ defining the first bearing 55 was measured from the direction 45 in which the apparatus 20 was pointing. The azimuth γ defining the third map bearing 65 was measured from north. Consequently, the difference between the azimuths σ, γ provides an indication of how much the electronic map 30 should be rotated (in order for the electronic map 30 to be correctly orientated).

Therefore, in this example, orientation circuitry 14 subtracts the azimuth σ defining the first bearing 55 from the azimuth γ defining the third bearing 65. The orientation circuitry 14 then aligns the north direction 46 on the map with the direction 45 in which the apparatus 20 is pointing, and rotates the electronic map 30 from north by the result, about the position 41 of the apparatus 20 on the electronic map 30.

The electronic map 30 is rotated relative to the front face 21 (and the display 24) of the apparatus 20. There is no need for a user to move the apparatus 20 to orientate the electronic map 30; the electronic map 30 may be orientated in the absence of any movement of the apparatus 20.

Figure 6:
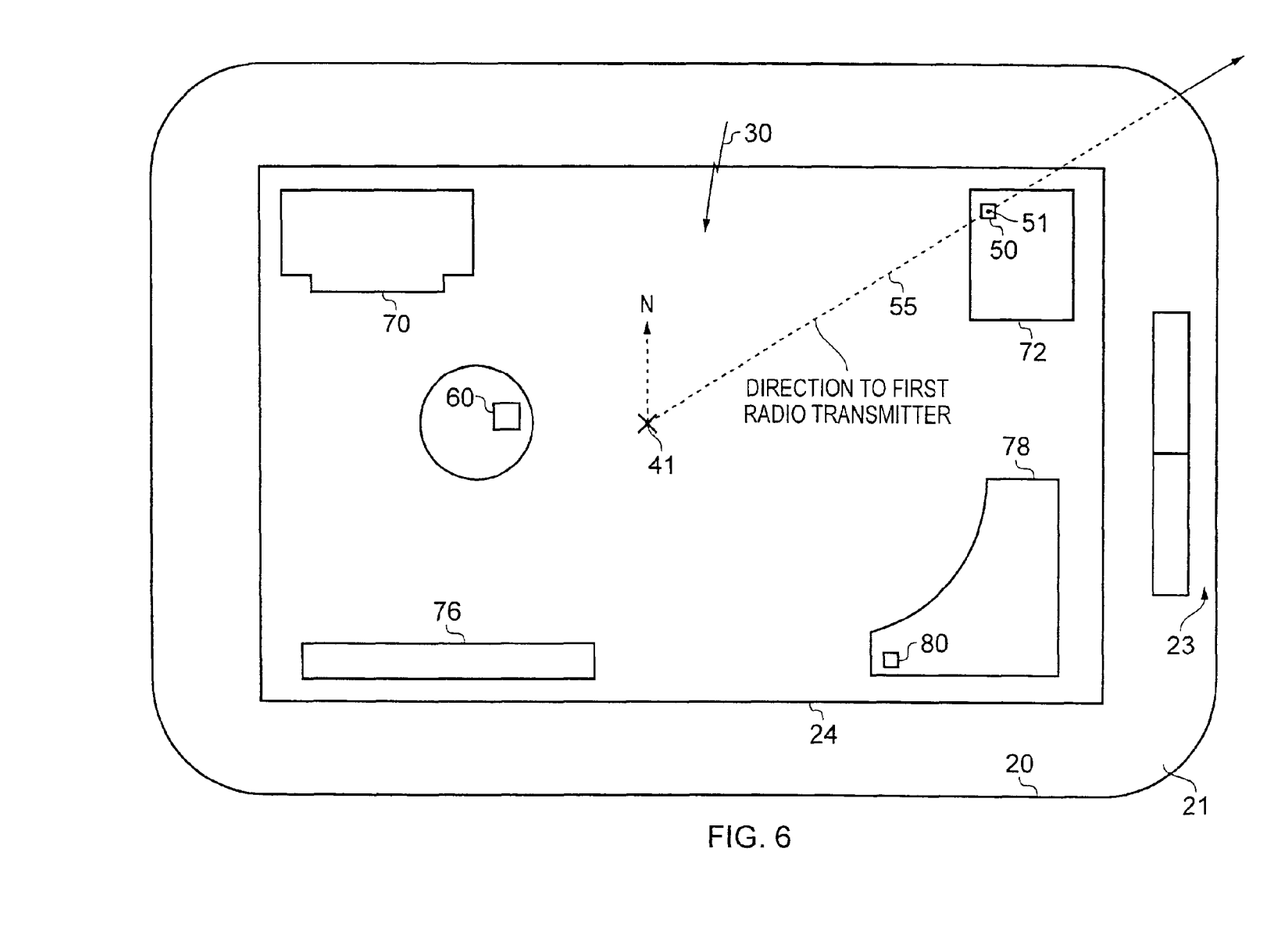
FIG. 6 illustrates an electronic map displayed on a display with a second orientation determined in accordance with embodiments of the invention.

The orientation circuitry 14 controls the display 24 to display the orientated electronic map 30. This is illustrated in FIG. 6. If the position 41 of the apparatus 20 and the position 51 of the first radio transmitter 50 are displayed on the electronic map 30 (as illustrated in FIG. 6), they both lie on the first bearing 55, from the apparatus 20 to the 'real life' first radio transmitter 50.

Advantageously, in FIG. 6, the electronic map 30 is correctly orientated with respect to the user's surroundings. This makes it easy for the user to orientate himself relative to his surroundings, without having to manually rotate the apparatus 20.

In some embodiments of the invention, the orientation circuitry 14 controls the display 24 to display the electronic map 30 prior to orientation of the electronic map 30, and then orientates the electronic map 30 while it is displayed on the display 24. Alternatively, in other embodiments of the invention, the electronic map 30 is orientated prior to it being displayed (initially) on the display 24.

The orientation circuitry 14 may continually re-orientate the electronic map 30 over time, using bearings determined from radio signals received from any of the radio transmitters 50, 60, 82. The re-orientation of the electronic map 30 on the display 24 may occur in real time as the apparatus 20 is moved by the user.

In the embodiments of the invention described above, the determination circuitry 12 determines the position 41 of the apparatus 20 using radio signals 52, 83 received from at least two different radio transmitters: the first radio transmitter 50 and the third radio transmitter 82. In other embodiments of the invention, the position 41 of the apparatus 20 may be determined using radio signals transmitted by a single radio transmitter. For example, the radio signals could be transmitted by different antenna elements (having different positions) at a single radio transmitter.

For example, different antenna elements of a single radio transmitter may transmit different radio signals in a time multiplexed fashion. Each of the transmitted radio signals may have a characteristic that enables the radio signal to be discriminated at the apparatus 20.

In some implementations of the invention, radio signals that are used to determine the position of the apparatus 20 are also be used to determine how to orientate the electronic map 30. In other implementations, one or more of the radio signals used to orientate the electronic map 30 are different to those used to determine the position of the apparatus 20. In these implementations, the radio signals used to orientate the electronic map 30 may or may not be transmitted by the same radio transmitter(s) are those used to determine the position of the apparatus 20.

The determination circuitry 12 may be configured to select the radio transmitter(s) that is/are used to determine the position 41 of the apparatus 20 and to orientate the electronic map 30. The radio transmitter(s) may be selected from a set of available radio transmitters 50, 60, 82. The determination circuitry 12 may, for example, analyze one or more radio signals from each of the available radio transmitters 50, 60, 82 and select one or more appropriate radio transmitters on the basis of the analysis.

It can be seen from FIG. 3 that the second radio transmitter 60 is positioned closer to the apparatus 20 than the first radio transmitter 50 and the third radio transmitter 82.

Figure 7A:
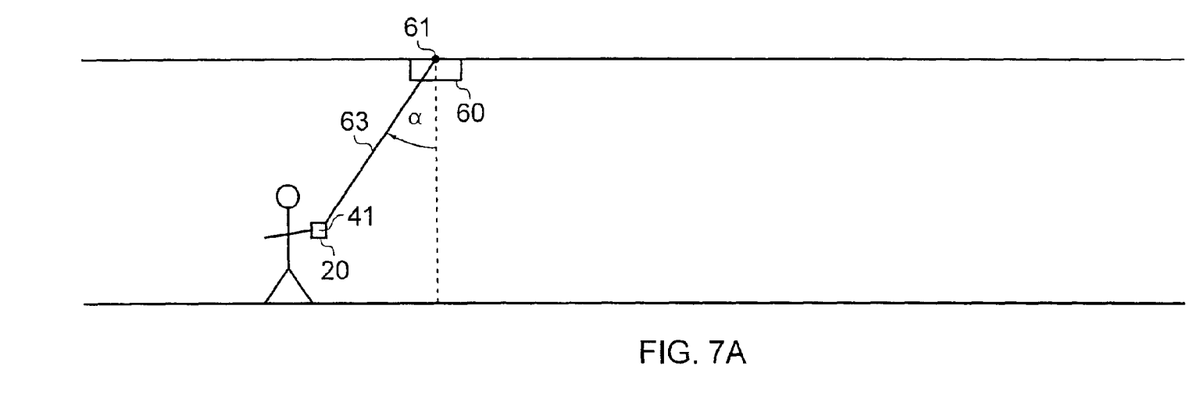
FIG. 7A illustrates an angle of elevation between an apparatus and a first radio transmitter.

FIG. 7A illustrates a bearing 63 from position 41 of the apparatus 20 to the position 61 of the second radio transmitter 60. As the apparatus 20 is located relatively close to the second radio transmitter 60, the angle of elevation α that defines the bearing 63 is small.

Figure 7B:
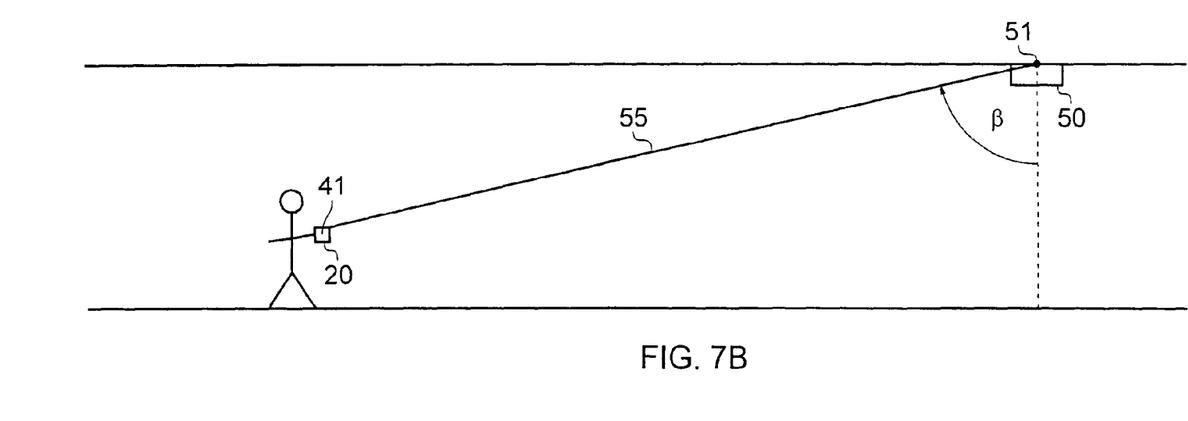
FIG. 7B illustrates an angle of elevation between an apparatus and a second radio transmitter.

FIG. 7B illustrates the bearing 55 from the position 41 of the apparatus 20 to the position of the first radio transmitter 60. As the apparatus 20 is located relatively far away from the first radio transmitter 50, the angle of elevation β that defines the bearing 55 is large.

The angle of elevation between the apparatus 20 and a radio transmitter therefore provides an indication of how close the apparatus 20 is to the radio transmitter.

As described above, the determination circuitry 12 may use an azimuth to define a bearing between the apparatus 20 and a radio transmitter. When the apparatus 20 is located close to a radio transmitter, it can be difficult to determine an accurate azimuth.

Consequently, if there are multiple radio transmitters available to the apparatus 20 for use in estimating a bearing, the determination circuitry 20 may be configured to select those that are further away from the apparatus 20 (such that the angle of elevation is large) in preference to those that are located close by. The determination circuitry 20 may do this analyzing one or more radio signals from a radio transmitter to determine an angle of elevation from the apparatus 20 to that radio transmitter. Alternatively or additionally, the determination circuitry 12 may determine a distance from the apparatus 20 to a radio transmitter using phase, time of flight and/or received signal strength intensity (RSSI) calculations.

It will be appreciated by those skilled in the art that while the angles of elevation α, β are illustrated as being angles of departure of received radio signals in the above example, this need not be the case. For example, angles of elevation could be determined by determining angles of arrival of radio signals received at the apparatus 20.

As mentioned above, one or more of the radio signals used to orientate the electronic map 30 may be different to the radio signals used to determine the position of the apparatus 20.

In one illustrative example, the determination circuitry 12 determines the direction of departure of received radio signals to determine the position of the apparatus 20. The determination circuitry 12 then uses the determined directions of departure to select an appropriate radio transmitter for use in orientating the electronic map 30 (for example, a radio transmitter that is sufficiently far away, as described above).

Once an appropriate radio transmitter has been selected, the determination circuitry 12 may determine a bearing from the selected radio transmitter by determining the direction of arrival of one or more further radio signals received from that radio transmitter. The orientation circuitry 30 may then orientate the electronic map 30 using that bearing (which may, for example, be a two dimensional bearing defined by an azimuth).

The determination circuitry 12 may use the calibration data 34 to interpret the one or more further radio signals, when determining the direction of arrival of the one or more further radio signals. The determination circuitry 12 may select an appropriate portion of the calibration data 34 to use, depending upon the direction of departure that was determined for the selected radio transmitter when determining the position of the apparatus 20. If the apparatus 20 comprises accelerometers, the determination circuitry 12 may use the accelerometers to optimize its selection of an appropriate portion of calibration data 34.

The determination circuitry 12 may make other considerations when selecting one or more appropriate radio transmitters, from the set of radio transmitters 50, 60, 82, for use in determining a position and/or orientating the electronic map 30.

For example, if a line of sight does not exist between a radio transmitter and the apparatus 20, a bearing determined using a radio signal received from that radio transmitter tends to be relatively inaccurate (compared to a situation where a line of sight exists). Consequently, the determination circuitry 12 may be configured to determine whether a line of sight exists between a radio transmitter and the apparatus 20, prior to using that radio transmitter to determine a position and/or orientate an electronic map 30. This may be done, for example, by making RSSI or time of flight calculations.

The blocks illustrated in FIG. 4 may represent steps in a method and/or sections of code in the computer program 27. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, in the embodiments of the invention described above, a comparison between a first bearing 55 and a third bearing 65 is used to orientate an electronic map 30. The third bearing 65 is determined by comparing the relative positioning of the apparatus 20 and the first radio transmitter 50 on the electronic map 30.

In other, alternative embodiments of the invention, there is no need to determine the third map bearing 65 by comparing the relative positioning of the apparatus 20 and the first radio transmitter 50 on the electronic map 30. In these embodiments, the radio signals transmitted by a radio transmitter may include data indicating the map bearing 65 from the apparatus 20 to the radio transmitter. For example, the radio transmitter may be positioned very far to the north of an area. Thus, the radio transmitter may be treated as being to the directly north of any apparatus located within that area. The radio signals transmitted by the radio transmitter may include data indicating to a receiving apparatus that the radio transmitter is located directly to the north.

It is stated above that the determination circuitry 12 may determine bearings and the position 41 of the apparatus using phase calculations. Alternatively or additionally, the determination circuitry 12 may make time of flight and/or RSSI calculations to determine bearings and/or the position 41 of the apparatus 20.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising:
   determination circuitry configured to determine a first bearing from a first location to a radio transmitter at a second location, using at least one radio signal received from the radio transmitter; and
   orientation circuitry configured to control orientation of an electronic map, to align the first bearing with a second bearing of the electronic map, from the first location to the radio transmitter.

2. An apparatus as claimed in claim 1, wherein the determination circuitry is configured to determine that the apparatus is at the first location on the electronic map, and configured, after analyzing the relative positioning of the apparatus and the radio transmitter on the electronic map, to control orientation of the electronic map to align the first bearing with the second bearing.

3. An apparatus as claimed in claim 1, wherein the determination circuitry is configured to determine the second bearing from the at least one radio signal received from the radio transmitter.

4. An apparatus as claimed in claim 1, wherein the orientation circuitry is configured to orientate the electronic map in the absence of movement of the apparatus.

5. An apparatus as claimed in claim 1, wherein the determination circuitry is configured, in response to the apparatus being moved from the first location to a third location, to determine a third bearing from the third location to the radio transmitter at the second location, and the orientation circuitry is configured, in response to determination of the third bearing, to control re-orientation of the electronic map to align the third bearing with a fourth bearing of the electronic map, from the third location to the radio transmitter.

6. An apparatus as claimed in claim 1, further comprising at least one of the following:
   i) wherein receiver circuitry is configured to receive the at least one radio signal from the radio transmitter,
   ii) wherein the determination circuitry is configured to select a radio transmitter suitable for use in orientating the electronic map.

7. An apparatus as in claim 1 further comprising at least one of the following:
   i) wherein the determination circuitry is configured to select a radio transmitter from multiple radio transmitters,
   ii) wherein the determination circuitry is configured to determine whether a radio transmitter is suitable for use in orientating the electronic map by analyzing at least one radio signal received from that radio transmitter,
   iii) wherein the determination circuitry is configured to determine whether a radio transmitter is suitable for use in orientating the electronic map by determining whether there is a line of sight between the first location and that radio transmitter,
   iv) wherein the determination circuitry is configured to determine whether a radio transmitter is suitable for use in orientating the electronic map by determining a distance between the first location and that radio transmitter,
   v) wherein the determination circuitry is configured to determine whether a radio transmitter is suitable for use in orientating the electronic map by determining an angle of elevation between the first location and that radio transmitter.

8. A method, comprising:
   determining a first bearing from a first location to a radio transmitter at a second location, using at least one radio signal received from the radio transmitter; and
   controlling orientation of an electronic map, to align the first bearing with a second bearing of the electronic map, from the first location to the radio transmitter.

9. A method as claimed in claim 8, further comprising: determining that an apparatus is at the first location on the electronic map; and controlling, after analyzing the relative positioning of the apparatus and the radio transmitter on the electronic map, the orientation of the electronic map to align the first bearing with the second bearing.

10. A method as claimed in claim 8, further comprising: determining the second bearing from the at least one radio signal received from the radio transmitter.

11. A method as claimed in claim 9, further comprising: determining a third bearing from a third location to the radio transmitter at the second location; and controlling re-orientation of the electronic map, to align the third bearing with a fourth bearing of the electronic map, from the third location to the radio transmitter.

12. A method as claimed in claim 8, further comprising: selecting a radio transmitter suitable for use in orientating the electronic map.

13. A method as claimed in claim 12, further comprising at least one of the following:
   i) wherein the radio transmitter is selected from multiple radio transmitters,
   ii), further comprising: determining whether a radio transmitter is suitable for use in orientating the electronic map by analyzing at least one radio signal received from that radio transmitter,
   iii) wherein the suitability of a radio transmitter for use in orientating the electronic map is determined by determining whether there is a line of sight between the first location and that radio transmitter,
   iv) wherein the suitability of a radio transmitter for use in orientating the electronic map is determined by determining a distance between the first location and that radio transmitter,
   v) wherein the suitability of a radio transmitter for use in orientating the electronic map is determined by determining an angle of elevation between the first location and that radio transmitter.

14. A computer program that, when executed by a processor, enables the method as claimed in claim 8 to be performed.

15. A non-transitory computer readable medium having a computer program stored thereon, the computer program comprising computer program instructions that, when executed by a processor, enable:
- determining a first bearing from a first location to a radio transmitter at a second location, using at least one radio signal received from the radio transmitter; and
- controlling orientation of an electronic map, to align the first bearing with a second bearing of the electronic map, from the first location to the radio transmitter.

16. A non-transitory computer program readable medium as claimed in claim 15, wherein the computer program instructions further enable: determining that an apparatus is at the first location on the electronic map; and controlling, after analyzing the relative positioning of the apparatus and the radio transmitter on the electronic map, the orientation of the electronic map, to align the first bearing with the second bearing.

17. An apparatus, comprising:
- determining means for determining a first bearing from a first location to a radio transmitter at a second location, using at least one radio signal received from the radio transmitter; and
- control means for controlling orientation of an electronic map, to align the first bearing with a second bearing of the electronic map, from the first location to the radio transmitter.

* * * * *